March 2, 1965 R. D. HANSEN 3,171,723
APPARATUS FOR THE FERMENTATION OF SOLID ORGANIC MATERIALS
Filed May 4, 1962 4 Sheets-Sheet 1
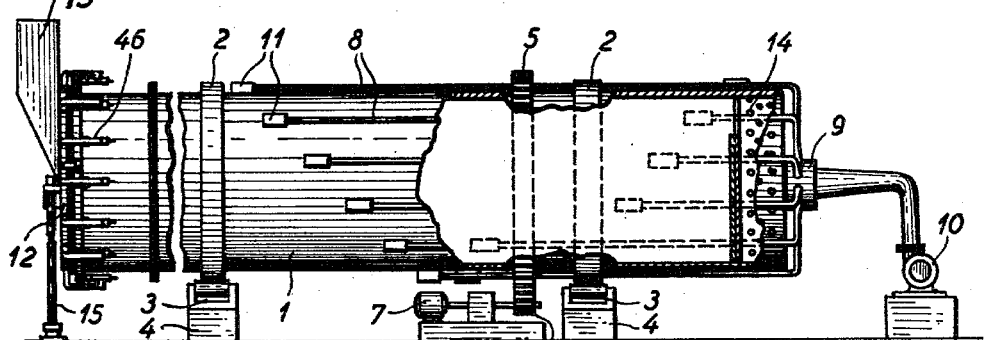
Fig. 1.
Fig. 2.
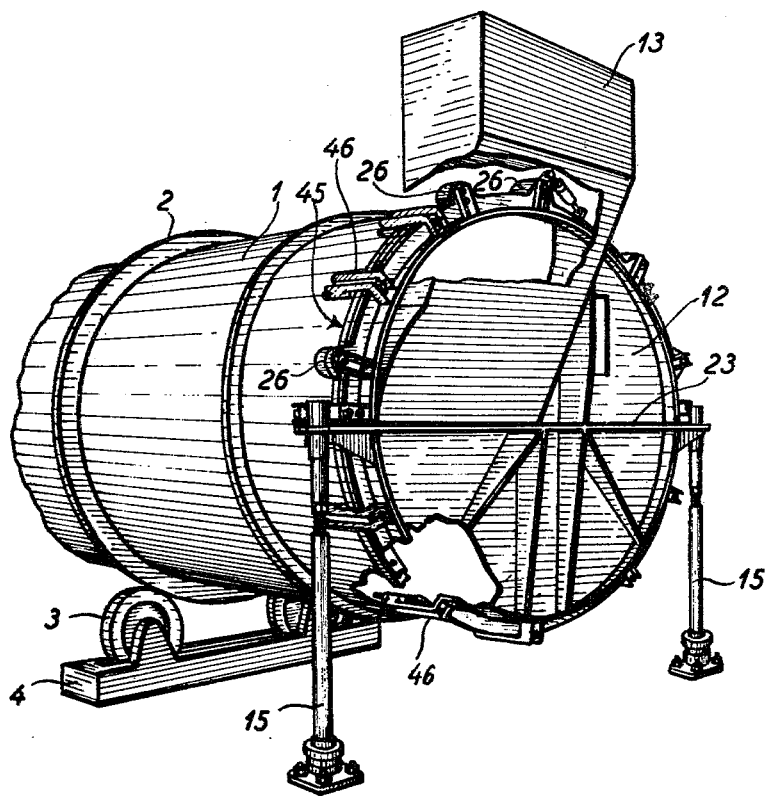

Fig. 3.
Fig. 4.
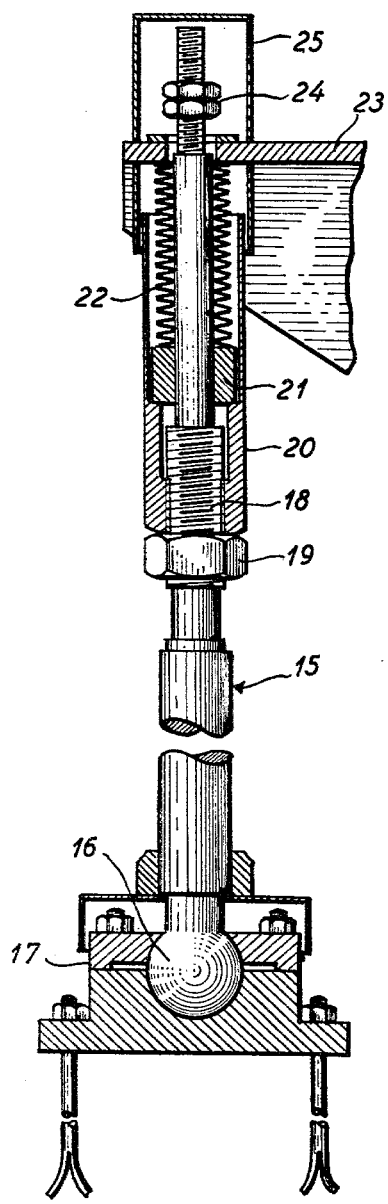
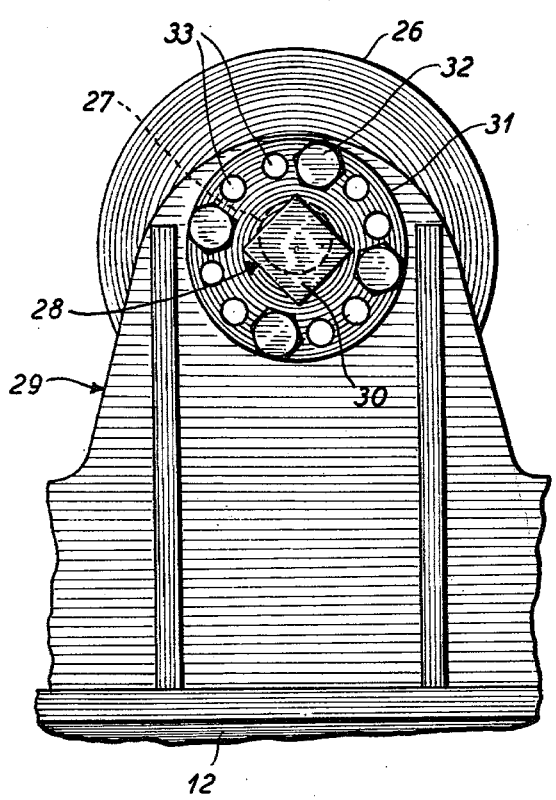

March 2, 1965   R. D. HANSEN   3,171,723
APPARATUS FOR THE FERMENTATION OF SOLID ORGANIC MATERIALS
Filed May 4, 1962   4 Sheets-Sheet 4

United States Patent Office 3,171,723
Patented Mar. 2, 1965

3,171,723
APPARATUS FOR THE FERMENTATION OF SOLID ORGANIC MATERIALS
Rune Dyrlund Hansen, Lyngby, Denmark, assignor to Dano Ingeniorforretning og Maskinfabrik, Ingenior Kai Petersen's Fond, Buddinge pr. Soborg, Denmark, a Danish corporation
Filed May 4, 1962, Ser. No. 192,403
Claims priority, application Great Britain, May 8, 1961, 16,731/61
12 Claims. (Cl. 23—259.1)

The invention relates to an apparatus for the fermentation of solid, organic materials, particularly organic waste materials, e.g., garbage and vegetable refuse, possibly with an addition of a liquid such as sludge, in a horizontally disposed, rotatable container, which is closed at one of its ends by means of a stationary end plate, wherein there is provided an aperture for the feeding of the materials into the container.

As a rule the apparatus is operated in such a way that the materials are advanced from said feeding aperture through the container in its longitudinal direction, while the container is rotated, whereby the materials therein are turned over and over. The required amount of aeration medium is supplied to the contents, so that the desired fermentation of the materials takes place during their passage through the container, and the materials have reached the desired degree of fermentation when they leave the container at the end opposite to the feed end.

Apparatus of the present nature are comparatively large and normally built with a diameter of 2 metres and more, and usually the work proceeds in the apparatus at a high degree of filling, as a rule about 80 percent. The material in the container exerts a pressure upon the end plate and attempts to force the latter away from the container, so that there is a risk that the connection between the end plate and the shell of the container does not remain tight, which is undesirable. Moreover, it will be understood that the pressure per unit of area exerted upon the end plate by the material in the container will be higher at the lowermost part of the end plate than the uppermost part of the end plate, thus rendering the problems of tightening even more difficult.

The object of the invention is to provide an apparatus of the aforesaid nature, wherein the end plate can always be held tightly fitting to the container shell, even if the work proceeds in the container at varying degrees of filling and with material of varying specific gravity.

According to the invention, there is provided apparatus for the fermentation of solid, organic materials, particularly organic waste materials, e.g., garbage and vegetable refuse, such apparatus comprising a substantially horizontal, rotatable container, which is closed at one end by means of a stationary end plate, in which an aperture for the feeding of the materials into the container is provided and which is supported on a base by means of supporting members, which may yield to influences in the plane of the end plate as well as transversely thereof, such end plate being maintained in contact with the container partly by means of guide rollers, which are carried by the end plate and rest on the peripheral face of an encircling annular flange protruding freely in the radial direction from the adjacent end of the container and partly by means of retaining rollers, which are also carried by the end plate and bear against the side face of said flange remote from the end plate.

The supporting members carry the substantial part of the weight of the end plate and at the same time prevent the end plate from rotating with the container. As the supporting members are capable of yielding to influences in the plane of the end plate as well as transversely thereof, it is possible for them to follow slight axial displacements and radial displacements, which could influence the end plate during the rotation of the container. Preferably, according to a further feature of the invention, the supporting members comprise a pair of pendulum columns, arranged one at each lateral edge of the end plate. The end plate conveniently rests on the supporting members by means of resilient intermediate members. Such resilient intermediate members may be so arranged that they are capable of absorbing besides a substantial part of the weight of the end plate also the force, which due to the friction between the container shell and the end plate, attempts to involve the end plate in the rotation of the container. At the same time, such resilient intermediate members would permit a slight radial movement of the end plate to take up any eccentricity which the said annular flange on the container may have in relation to the axis of the container.

The actual maintenance of contact between the end plate and the container is divided between two groups of rollers, namely guide rollers and retaining rollers, which cooperate with an annular flange provided on the container. The guide rollers are furthermore designed to maintain the end plate in contact with the container shell in the radial plane. Advantageously, according to a further feature of the invention, the guide rollers are distributed around the upper half of the circumference of the end plate. The distribution may furthermore be so effected that the majority of the guide rollers are located in the upper section of the said upper half of the circumference of the end plate, so as not to have a too large load per roller. The said rollers will then cooperate in carrying the weight of the end plate. Rollers placed farther towards the lateral edges of the end plate would serve substantially to restrict horizontal displacements of the end plate in its plane.

In order to enhance the intended guiding effect of the guide rollers, at least some of the guide rollers are preferably adjustable in the plane of the end plate, so that their abutment against the annular flange can be regulated. In one form, at least one of said adjustable guide rollers may be mounted on a roller journal eccentrically connected with an axle journal, which extends in the same direction as the roller journal and is rotatably and lockably mounted on the end plate. By rotating such axle journal, the roller journal with the guide roller may be swung into abutment against the annular flange and subsequently locked in the abutting position. In an alternative form, at least one of said adjustable guide rollers may be controlled by a spring-loaded adjustment mechanism so that the abutment of such roller against the annular flange is maintained by spring pressure.

The retaining rollers maintain the end plate in contact with the container shell in the axial direction, and they are conveniently distributed around the circumference of the end plate. According to a still further feature of the invention, the retaining rollers may be mounted on arms so as to be longitudinally displaceable thereon, such arms being attached to the end plate and protruding axially of the container beyond the said annular flange thereon. The retaining pressure of the retaining rollers may then be adjusted so that along the whole of its circumference the end plate can be made to fit tightly to the container.

The construction according to the invention ensures that the maintenance of the end plate in contact with the container shell can be adjusted and regulated in accordance with the circumstances, so that a tight connection between the end plate and the container shell can be provided and maintained.

One embodiment of apparatus according to the invention will now be described by way of example with reference to the accompanying drawings wherein:

FIG. 1 is a schematic side-view of the apparatus;

FIG. 2 shows in perspective and on a larger scale the feed end of the apparatus;

FIG. 3 shows a supporting column for the end plate of the apparatus, partly from the side and partly in section;

FIG. 4 is a fragmentary view showing a guide roller for the end plate of the apparatus of FIGURES 1 and 2;

Figure 5:
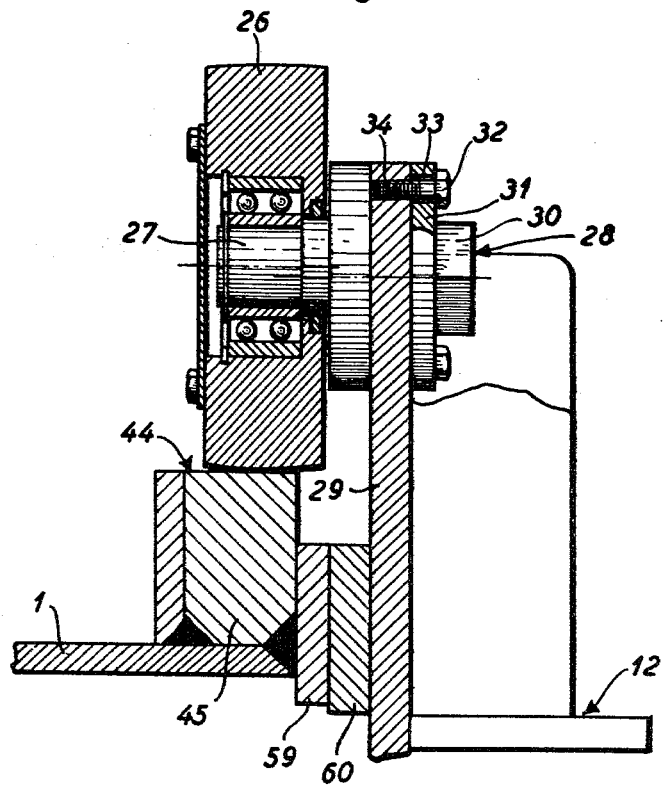
FIG. 5 is a longitudinal section through the guide roller according to FIG. 4 and appurtenant parts of the apparatus.

The apparatus illustrated comprises an elongated container 1 in the form of a drum, on the shell of which there are provided encircling rails 2, by which the container rests on rollers 3, mounted on brackets 4. To the container shell there is also attached a gear rim 5, engaged by a gear wheel 6, which is connected to a motor 7 through a gearing, so that by means of this motor the container may be rotated about its longitudinal axis.

The container shell carries air pipes 8, emanating from an air distributor 9, which is connected with a fan 10, such air pipes 8 on their free ends issuing into valve boxes 11, from which the air may be blown into the container through valves.

On its left-hand end as seen in FIGURE 1, the container is closed by means of an end plate 12, which has a feeding hopper 13 for materials to be processed in the container 1. On its right-hand end the container 1 has a drum screen 14 for processed material, leaving the container at this end.

The end plate 12 is supported by two supporting members in the form of pendulum columns 15, one on either side of the end plate. The columns are identical. Each column rests with a ball head 16 in a bracket 17, so that the column may swing in relation to this bracket. On its uppermost end the column has an externally threaded spindle section 18, on which there is screwed an adjustment nut 19, carrying a sleeve 20 having an abutment ring 21, on which a compression spring 22 is supported. On the spring 22 rests the end of a cross member 23, which is attached to the end plate 12 so that the latter will be capable of some up and down movement, the spring 22 thus being slackened and compressed. To limit the movement of the end plate in relation to the supporting columns, counter members 24 in the form of nuts are provided on the columns at a position above the cross member 23. Each supporting column is covered at the top with a hood 25.

Distributed around the upper half of the circumference of the end plate 12 are a number of guide rollers 26, which are connected with the end plate and mounted on a roller journal 27 so connected with an axle journal 28 that the latter, which extends in the same direction as the roller journal, is somewhat displaced to the side of the roller journal 27. The axle journal 28 is mounted in an upright 29, which is attached to the end plate 12. The axle journal 28 has a square end 30, which extends through a square hole in a lock washer 31. The lock washer 31 is secured to the upright 29 by means of arresting screws 32, which are passed through predetermined holes 33 in the lock washer 31 and screwed into arresting holes 34 in the upright 29.

When the axle journal 28 is rotated, the roller journal 27 with the guide roller 26 may be swung towards or away from the end plate, and the journal 28 may be arrested in the desired one of a plurality of positions by engaging the arresting screws 32 through the appropriate holes 33 in the lock washer 31 and into the holes 34.

Preferably, as shown, the majority of the rollers 26 are located in the upper section of the upper half of the circumference of the end plate.

Figure 6:
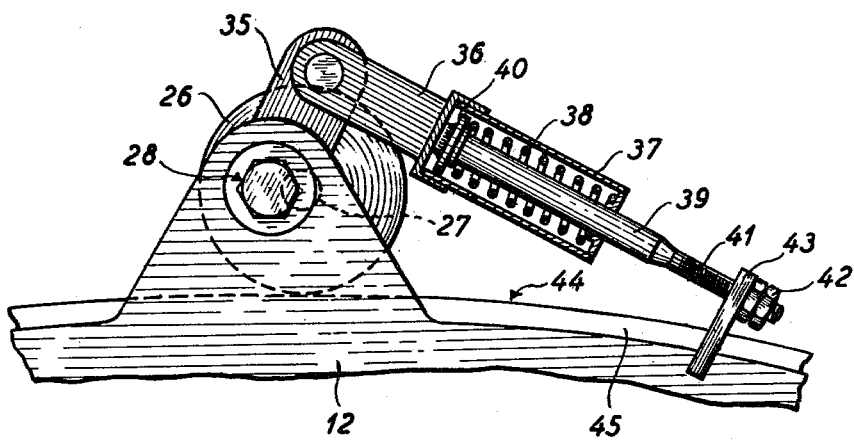
FIG. 6 is a fragmentary view showing a further form of guide roller which may be used.

In the form of guide roller 26, shown in FIGURE 6, a radial arm 35 is connected with the axle journal 28 and to the free end of such arm there is connected by means of a link a tension arm 36 having a bushing 37, in which there is disposed a compression spring 38. A tension rod 39 abuts with a collar 40 against the left-hand end of the tension spring as seen in FIGURE 6, and at its opposite end it is provided with a threaded spindle section 41, on which there are screwed nuts 42, which bear against an abutment 43, attached to the end plate 12. Tightening of the nuts 42 causes the radial arm 35 through the tension rod 39, the compression spring 38, and the tension arm 36 to be swung to the right with the result that the guide roller 26 in the shown arrangement is swung downwardly towards the end plate 12.

The guide rollers are designed to run on the peripheral face 44 of an annular flange 45, which is attached to the container 1 at the end of the container shell facing the end plate 12. Such annular flange 45 completely encircles the container shell and protrudes freely in the radial direction. It will be understood that the guide rollers 26 by means of the device shown in FIGURES 4 and 5 or the device shown in FIGURE 6 may arbitrarily or automatically be held against the peripheral face 44. The arrangement may also provide for some guide rollers 26 to be non-adjustable, while the rest of the guide rollers 26 are adjustable, either as shown in FIGURES 4 and 5 or as shown in FIGURE 6.

Figure 7:
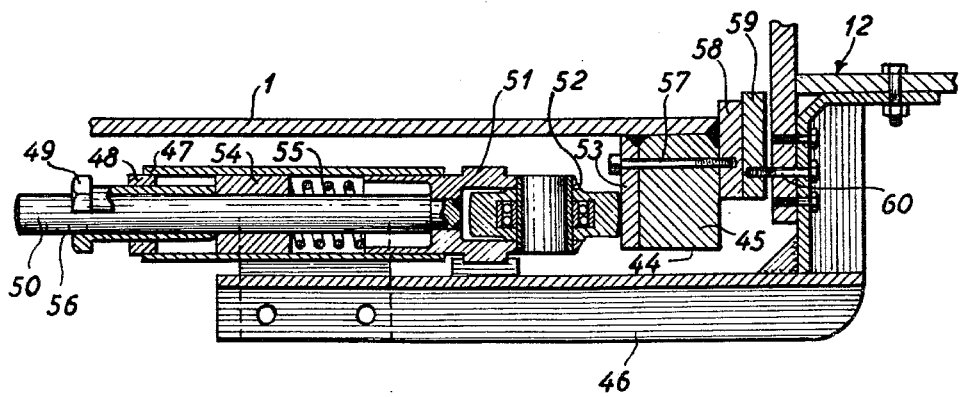
FIG. 7 is a longitudinal section through a retaining roller for the end plate of the apparatus with appurtenant parts of the apparatus.

To the end plate 12 there are furthermore attached a number of arms 46, which are distributed along the circumference of the end plate, such arms protruding in the axial direction past the annular flange 45. To each of these arms is attached a housing 47 having an internal, fixed abutment 48 for a hollow screw spindle 49, which is in threaded engagement with the abutment 48 as well as with a spindle 50, which extends through the spindle 49 and is connected on its right-hand end as seen in FIGURE 7 with a journal bearing 51 for a retaining roller 52, which abuts against the outer side 53 of the annular flange 45, such side facing away from the end plate 12. A damping spring 55 is preferably, as shown, disposed between the journal bearing 51 and another abutment 54 in the housing.

The tightening pressure of the retaining roller 52 against the annular flange 45 may be regulated by means of the screw spindle 49. For this purpose the spindle 49 may be provided with a scale 56.

A tightening ring 58 is attached to the end of the container shell adjacent the end plate 12 by means of a screw 57, which is passed through the annular flange 45, the ring 58 being designed to co-operate with a further tightening ring 59, which is secured to the end plate 12 by means of screws 60.

Having thus fully described my invention I claim as new and desire to secure by Letters Patent:

1. Apparatus for making compost from non-fluid waste materials containing fermentable organic substances, which comprises a solid walled elongated container, said container comprising a shell, means for mounting said container for rotation about a horiozntally disposed axis, an end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guiding means arranged on said end plate for cooperation with radially disposed guiding means on the shell of the container at the end of the container adjacent to said end plate for guiding said end plate with respect to displacements substantially in the plane of said plate, retaining means arranged on said end plate for cooperation with axially disposed retaining means on the shell of the container at the same end thereof for retaining said end plate to the shell, with respect to displacements substantially transverse to the plane of said plate, and discharge means at the opposite end of the container from said feeding aperture.

2. Apparatus for making compost from non-fluid waste materials containing fermentable organic substances, which comprises a solid walled elongated container, said container comprising a shell, means for mounting said container for rotation about a horizontally disposed axis, an end plate for closing said container at one end thereof, a pair of supporting pendulum columns for supporting said end plate on a base, one column at each lateral edge of the end plate, said columns at their lower end being adapted for swinging engagement with said base, guiding means arranged on said end plate for cooperation with radially disposed guiding means on the shell of the container at the end of the container adjacent to said end plate for guiding said end plate with respect to displacements substantially in the plane of said plate, retaining means arranged on said end plate for cooperation with axially disposed retaining means on the shell of the container at the same end thereof for retaining said end plate to the shell with respect to displacements substantially transverse to the plane of said plate, and discharge means at the opposite end of the container from said feeding aperture.

3. Apparatus for making compost from non-fluid waste materials containing fermentable organic substances, which comprises a solid walled elongated container, said container comprising a shell, means for mounting said container for rotation about a horizontally disposed axis, an end plate for closing said container at one end thereof, a feeding aperture for said materials arranged in said end plate, a pair of supporting pendulum columns for supporting said end plate on a base, one column at each lateral edge of the end plate, resilient resting means at the upper end of said columns for cooperation with bracket means attached to said end plate, the columns at their lower end being adapted for swinging engagement with said base, guiding means arranged on said plate for cooperation with radially disposed guiding means on the shell of the container at the end of the container adjacent to said end plate for guiding said end plate with respect to displacements substantially in the plane of said plate, retaining means arranged on said end plate for cooperation with axially disposed retaining means on the shell of the container at the same end thereof for retaining said end plate to the shell with respect to displacements substantially transverse to the plane of said plate, and discharge means at the opposite end of the container from said feeding aperture.

4. Apparatus for making compost from non-fluid waste materials containing fermentable organic substances, which comprises a solid walled elongated container, said container comprising a shell, means for mounting said container for rotation about a horizontally disposed axis, an end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guide rollers mounted on said end plate at spaced intervals along at least the upper half of the circumference of the end plate, an encircling annular flange member on said shell and extending outwardly from said shell in the radial direction from the end of the container adjacent to the end plate, said annular flange member having a peripheral face for cooperation with the peripheral faces of said guide rollers, retaining means arranged on said end plate for cooperation with axially disposed retaining means on the shell of the container at the same end thereof for retaining said end plate to the shell with respect to displacements substantially transverse to the plane of said plate, and discharge means at the opposite end of the container from said feeding aperture.

5. Apparatus as in claim 4, the majority of said guide rollers being located in the upper section of the said upper half of the circumference of the end plate.

6. Apparatus as in claim 4, at least some of said guide rollers being mounted for adjustment in the plane of the end plate.

7. Apparatus as in claim 4, at least some of said guide rollers being mounted spring-loaded for adjustment in the plane of the end plate.

8. Apparatus for making compost from non-fluid waste materials containing fermentable organic substances, which comprises a solid walled elongated container, said container comprising a shell, means for mounting said container for rotation about a horizontally disposed axis, and end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guide rollers mounted on said end plate at spaced intervals along at least the upper half of the circumference of the end plate, at least some of said guide rollers being mounted on a roller journal excentrically connected with an axle journal extending in the same direction as the roller journal, the said axle journal being mounted for rotation on the end plate and provided with locking means for locking the axle journal with respect to the end plate, an encircling annular flange member on said shell and extending outwardly from said shell in the radial direction from the end of the container adjacent to the end plate, said annular flange member having a peripheral face for cooperation with the peripheral faces of said guide rollers, retaining means arranged on said end plate for cooperation with axially disposed retaining means on the shell of the container at the same end thereof for retaining said end plate to the shell with respect to displacement substantially transverse to the plane of said plate, and discharge means at the opposite end of the container from said feeding aperture.

9. Apparatus for making compost from non-fluid waste materials containing fermentable organic substances which comprises a solid walled elongated container, said container comprising a shell, means for mounting said container for rotation about a horizontally disposed axis, and end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guiding means arranged on said end plate for cooperation with radially disposed guiding means on the shell of the container at the end of the container adjacent to said end plate for guiding said end plate with respect to displacements substantially in the plane of said plate, retaining means arranged on said end plate for cooperation with axially disposed retaining means on the shell of the container at the same end thereof for retaining said end plate to the shell, with respect to displacements substantially transverse to the plane of said plate, said retaining means being distributed at spaced intervals along the circumference of the end plate, and discharge means at the opposite end of the container from said feeding aperture.

10. Apparatus for making compost from non-fluid waste materials containing fermentable organic substances, which comprises a solid walled elongated container, said container comprising a shell, means for mounting said container for rotation about a horizontally disposed axis, an end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guiding means arranged on said end plate for cooperation with radially disposed guiding means on the shell of the container at the end of the container adjacent to said end plate for guiding said end plate with respect to displacements substantially in the plane of said plate, retaining rollers mounted on said end plate of spaced intervals at the periphery thereof, and encircling annular flange member on said shell and extending outwardly from said shell in the radial direction from the end of the container adjacent to the end plate, said annular flange member having a radially disposed circumferential face remote from said end plate for cooperation with the peripheral faces of said retaining rollers, and discharge means at the opposite end of the container from said feeding aperture.

11. Apparatus as in claim 10, wherein a number of supporting arms are attached to the end plate and protruding from said end plate axially of the container and beyond said annular flange thereon, the said retaining rollers being displaceably mounted on said arms for adjustment along the arms.

12. Apparatus for making compost from non-fluid waste materials containing fermentable organic substances, which comprises a solid walled elongated container, said container comprising a shell, means for mounting said container for rotation about a horizontally disposed axis, an end plate for closing said container at one end thereof, a feeding aperture for said materials arranged in said end plate, supporting means for supporting said end plate on a base, said supporting means being adapted for yielding to mechanical forces in the plane of the end plate as well as transversely thereof, guide rollers mounted on said end plate at spaced intervals along at least the upper half of the circumference of the end plate, retaining rollers mounted on said end plate at spaced intervals at the periphery thereof, an encircling annular flange member on said shell and extending outwardly from said shell in the radial direction from the end of the container adjacent to the end plate, said annular flange member having a peripheral face for cooperation with the peripheral faces of said guide rollers and a radially disposed circumferential face remote from said end plate for cooperation with the peripheral faces of said retaining rollers, and discharge means at the opposite end of the container from said feeding aperture.

References Cited by the Examiner
UNITED STATES PATENTS

| | | | |
|---|---|---|---|
| 2,253,098 | 8/41 | Schneider | 263—32 |
| 2,473,710 | 6/49 | Jillson | 285—134 |
| 2,517,470 | 8/50 | Erisman | 34—135 X |
| 2,969,277 | 1/61 | Carlsson et al. | 23—286 X |
| 3,055,744 | 9/62 | Petersen | 23—259.1 |

MORRIS O. WOLK, *Primary Examiner.*

JAMES H. TAYMAN, Jr., *Examiner.*